(12) United States Patent
Pease

(10) Patent No.: US 6,593,587 B2
(45) Date of Patent: Jul. 15, 2003

(54) NON-CONTACT MEASUREMENT DEVICE FOR QUICKLY AND ACCURATELY OBTAINING DIMENSIONAL MEASUREMENT DATA

(75) Inventor: Alfred A. Pease, Ann Arbor, MI (US)

(73) Assignee: Perceptron, Inc., Plymouth, MI (US)

( * ) Notice: Subject to any disclaimer, the term of this patent is extended or adjusted under 35 U.S.C. 154(b) by 0 days.

(21) Appl. No.: 09/803,535

(22) Filed: Mar. 9, 2001

(65) Prior Publication Data

US 2001/0028025 A1 Oct. 11, 2001

Related U.S. Application Data

(60) Provisional application No. 60/188,592, filed on Mar. 10, 2000.

(51) Int. Cl.$^7$ ................................................ G01B 11/00
(52) U.S. Cl. .......................... 250/559.19; 250/559.22; 250/559.23; 356/625; 356/634
(58) Field of Search .......................... 250/206.2, 208.6, 250/559.19, 559.22, 559.23, 559.24, 559.4; 356/485, 492, 496, 141.5, 355, 357, 625, 614–615, 621–623, 603, 630, 634, 635, 636, 637

(56) References Cited

U.S. PATENT DOCUMENTS 4,227,813 A * 10/1980 Pirlet ........................ 356/3.04
6,049,385 A    4/2000 Norita et al.
6,172,755 B1 * 1/2001 Norita et al. ................ 356/376
6,243,165 B1 * 6/2001 Norita et al. ................ 356/376
6,256,595 B1 * 7/2001 Schwalb et al. ................ 703/1
6,373,579 B1 * 4/2002 Ober et al. .................. 356/627

* cited by examiner

*Primary Examiner*—Robert H. Kim
*Assistant Examiner*—Hoon K. Song
(74) *Attorney, Agent, or Firm*—Harness, Dickey & Pierce, P.L.C.

(57) ABSTRACT

A hand-held or tool integrated measurement device is provided for quickly and accurately performing non-contact measurements of dimensions and/or angles associated with various objects in a home or commercial work area. The measurement device generally includes at least one user input element, a non-contact sensor, an image processor and a display element packaged in a portable housing assembly. In operation, a user initiates the measurement by activating the user input element associated with the measurement device. The non-contact sensor receives a trigger signal from the user input element and is operative to collect image data representative of at least a portion of the surface of a measured object. The image processor in turn receives the image data from the non-contact sensor and is operative to convert the image data into measurement data for the measured object. The display element is operable to visually display the measurement data to the user.

11 Claims, 8 Drawing Sheets

NON-CONTACT MEASUREMENT DEVICE FOR QUICKLY AND ACCURATELY OBTAINING DIMENSIONAL MEASUREMENT DATA

This application claims priority under 35 U.S.C. §119(e) to U.S. Provisional Application No. 60/188,592 filed on Mar. 10, 2000.

BACKGROUND AND SUMMARY OF THE INVENTION

The present invention relates generally to a non-contact measurement device and, more particularly, a hand-held or tool integrated measurement device for quickly and accurately performing non-contact measurements of dimensions and/or angles associated with various objects in a home or commercial work area.

Measurement of angles and dimensions of wood products and woodworking equipment has up to now been performed through the use of various mechanical and electronic calipers, squares, protractors, steel rules, tape measurers, levels, and point range measuring devices. These various devices suffer from mechanical inaccuracies and human visual limitations (such as parallax). Furthermore, these devices require sometimes difficult direct or impossible physical contact with the object being measured. It is the purpose of the present invention to improve accuracy, remove most human judgement of measurement results, allow for measurements that are impossible to perform mechanically, and provide more convenient, faster measurements than conventional measurement devices.

In accordance with the present invention, a hand-held or tool integrated measurement device is provided for quickly and accurately performing non-contact measurements of dimensions and/or angles associated with various objects in a home or commercial work area. The measurement device generally includes an user input element, a non-contact sensor, an image processor and a display element packaged in a portable housing assembly. In operation, a user initiates the measurement by activating the user input element associated with the measurement device. The non-contact sensor receives a trigger signal from the user input element and is operative to collect image data representative of at least a portion of the surface of a measured object. The image processor in turn receives the image data from the non-contact sensor and is operative to convert the image data into measurement data for the measured object. The display element is operable to visually display the measurement data to the user.

In one aspect of the present invention, a hand-held measurement device measures dimensions of various cuts and angles of wood, plastic, ceramic and metal pieces produced in a home or commercial work area.

In another aspect of the present invention, a portable measurement device may be integrated with various power tool equipment, such as table saws, miter saws, radial arm saws, band saws, the drill presses, routers, shapers, planers, joiners and lathe.

For a more complete understanding of the invention, its objects and advantages, reference may be had to the following specification and to the accompanying drawings.

DETAILED DESCRIPTION OF THE PREFERRED EMBODIMENTS

Figure 1:
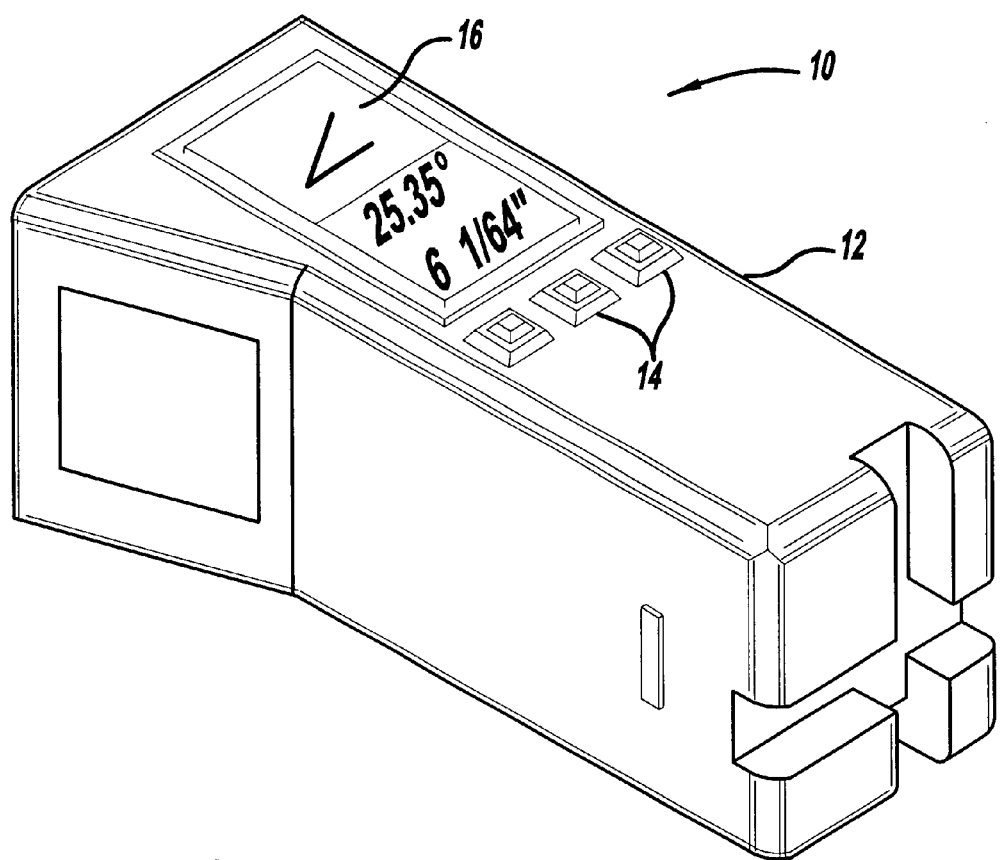
FIG. 1 is a perspective view of a portable non-contact measurement device in accordance with the present invention.

An exemplary portable measurement device 10 in accordance with the present invention is shown in FIG. 1. The portable measurement device 10 is housed in a housing assembly 12 which is sized to be hand-held by a user. It should be appreciated that housing assembly 12 may further include other design features (such as a handle or a hand-formed gripping area) that facilitate the portable nature of the measurement device 10. The operation of the measurement device may be controlled via the user interface elements integrated into the housing assembly 12. In this preferred embodiment, one or more push buttons 14 are used to receive input from the user and a display 16 is used to visually output measurement data to the user.

Figure 2:
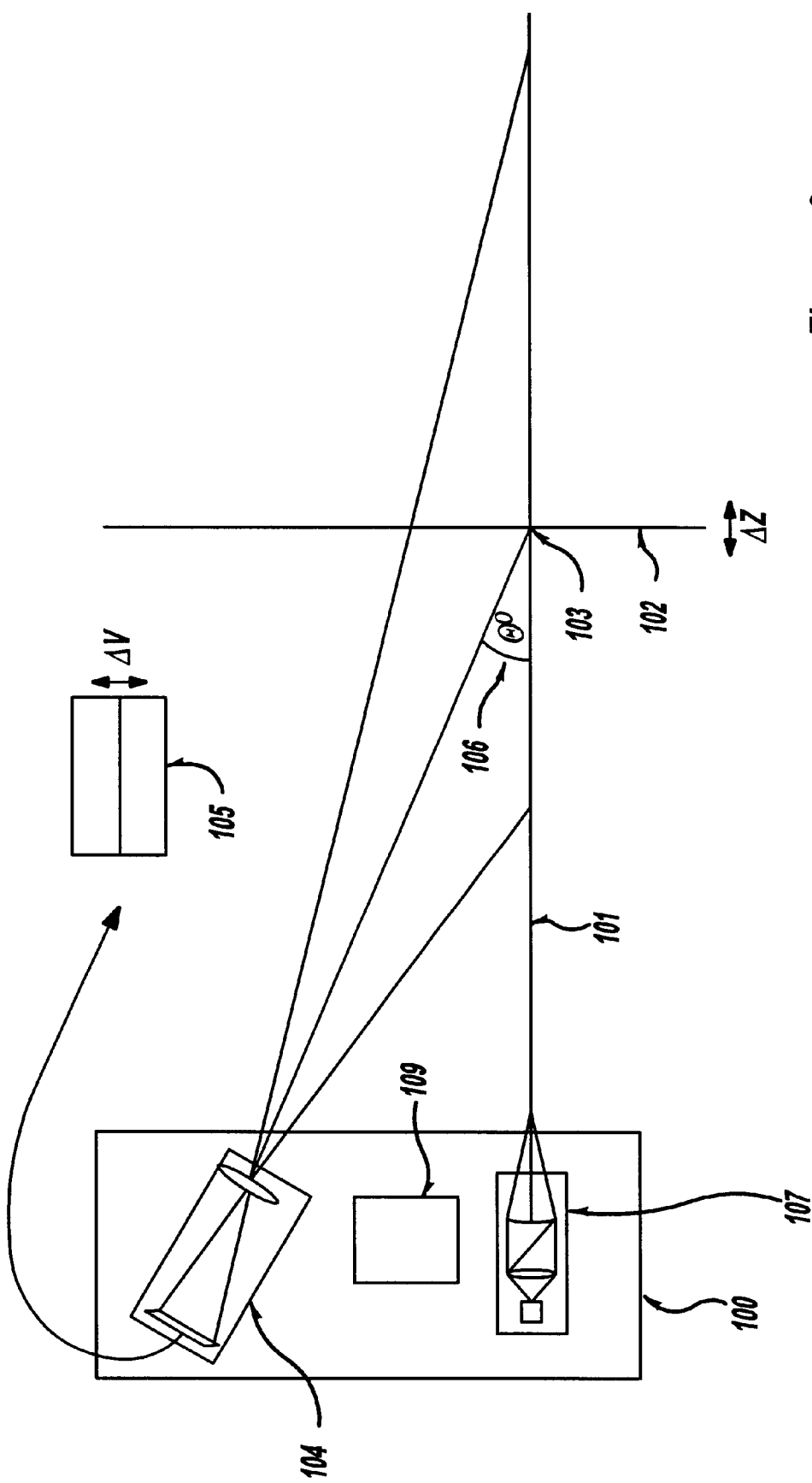
FIG. 2 is a diagram illustrating laser triangulation technology as employed in an exemplary non-contact sensor.

Referring to FIG. 2, the portable measurement device 10 is based on well known laser triangulation technology heretofore employed in various commercially available non-contact sensors. In general, a non-contact sensor 100 projects one or more planes of laser light 101 towards an object 102. The laser plane 101 is projected by a light source assembly 107 that preferably includes a laser diode, a laser projection lens assembly and accompanying electronics for controlling the light source assembly. The points of intersection of the projected laser plane and the object 103 are then imaged by a electronic camera assembly 104. The electronic camera assembly 104 preferably comprises an imaging array (e.g, CCD or CMOS), a lens assembly, and accompanying electronics for controlling the electronic camera assembly.

The image data for a flat object oriented perpendicular to the laser plane is a nominally straight line as shown in inset 105. Due to the triangular relationship between the light source and the electronic camera assembly, displacement of the object 102 toward or away from the sensor 100 results in the movement of the image data up and down, respectively. The resolution of vertical displacement in the image (V) depends on the thickness of the laser line, the number of pixels in the electronic camera and the overall signal to noise ratio of the imaging system. As will be apparent to one skilled in the art, the triangulation angle (at the center of the field) is typically between 15 degrees and 25 degrees. For further details regarding an exemplary non-contact sensor, reference may be had to the TriCam sensors manufactured by Perceptron. Inc. of Plymouth, Mich.

Figure 3:
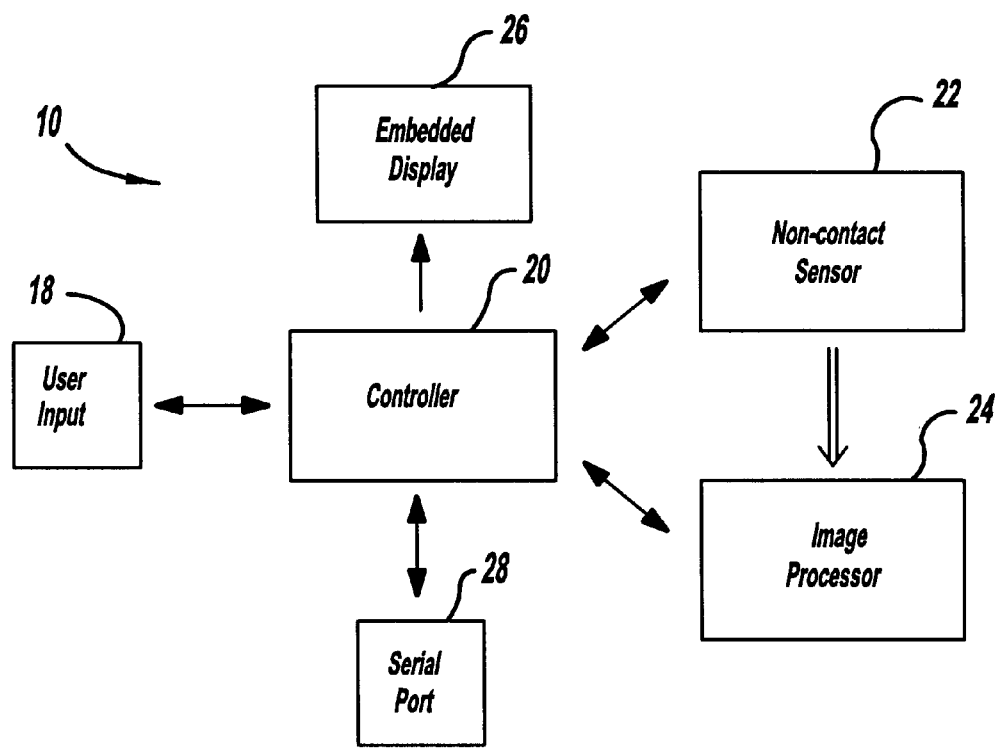
FIG. 3 is a block diagram depicting the primary components of the non-contact measurement device in accordance with the present invention.

FIG. 3 illustrates the basic components associated with the portable measurement device 10 of the present invention. The portable measurement device 10 generally includes one or more user input elements 18, a controller 20, a non-contact sensor 22, an image processor 24, a display 26, and a power supply (e.g., a battery). It should be appreciated that one or more subcomponents from an exemplary non-contact sensor (rather than a complete sensor unit) may be incorporated into the portable measurement device 10.

One or more user input elements 18 receive input commands from a user of the measurement device. Input commands may include power on/off commands, measurement trigger commands, measurement mode commands, measurement origin offset commands, etc. The input commands are in turn communicated to the controller 20. The user input elements 18 may assume a variety of forms, including push buttons, radial knobs, a touch screen display, or a combination thereof.

The controller 20 controls the overall operation of the measurement device 10. For instance, the controller 20 interfaces with the non-contact sensor 22 to facilitate acquisition of image data for a measured object. In particular, the controller 20 may issue power on/off commands and/or power setting commands to the light source associated with the non-contact sensor 22. The controller 20 may also issue power on/off commands, measurement trigger commands, exposure commands, resolution setting commands, and/or data transfer commands to the imaging array associated with non-contact sensor 22.

Furthermore, the controller 20 interfaces with the image processor 24. The image processor 24 is adapted to retrieve image data from the non-contact sensor 22 and to convert the image data into measurement data for the measured object. The image processor 24 includes one or more algorithms for converting the raw image data into measurement data as is well known in the art. It is envisioned that a different algorithm may be used depending on the type of measurement being taken (e.g., width of an object, angle between two adjacent surface, etc.) by the device.

A display 26 embedded into the housing of the measurement device is used to visually display the measurement data to the user. To do so, the display is adapted to receive measurement data from the image processor 24. In addition, the display 26 may further receive input commands from the controller as to how the dimensional data is to be displayed to the user. The display 26 may be graphic or numeric and assume a variety of forms, such as an LED or a LCD.

The portable measurement device 10 may optionally include an external communication port 28 (e.g., RS-322, USB, wireless port, etc). It is envisioned that the controller 20 may transmit measurement data via the communication port 28 to an external source. In addition, the controller 20 may also receive remote activation commands or updates to the software algorithms via the communication port 28 from an external source.

Figure 4A:
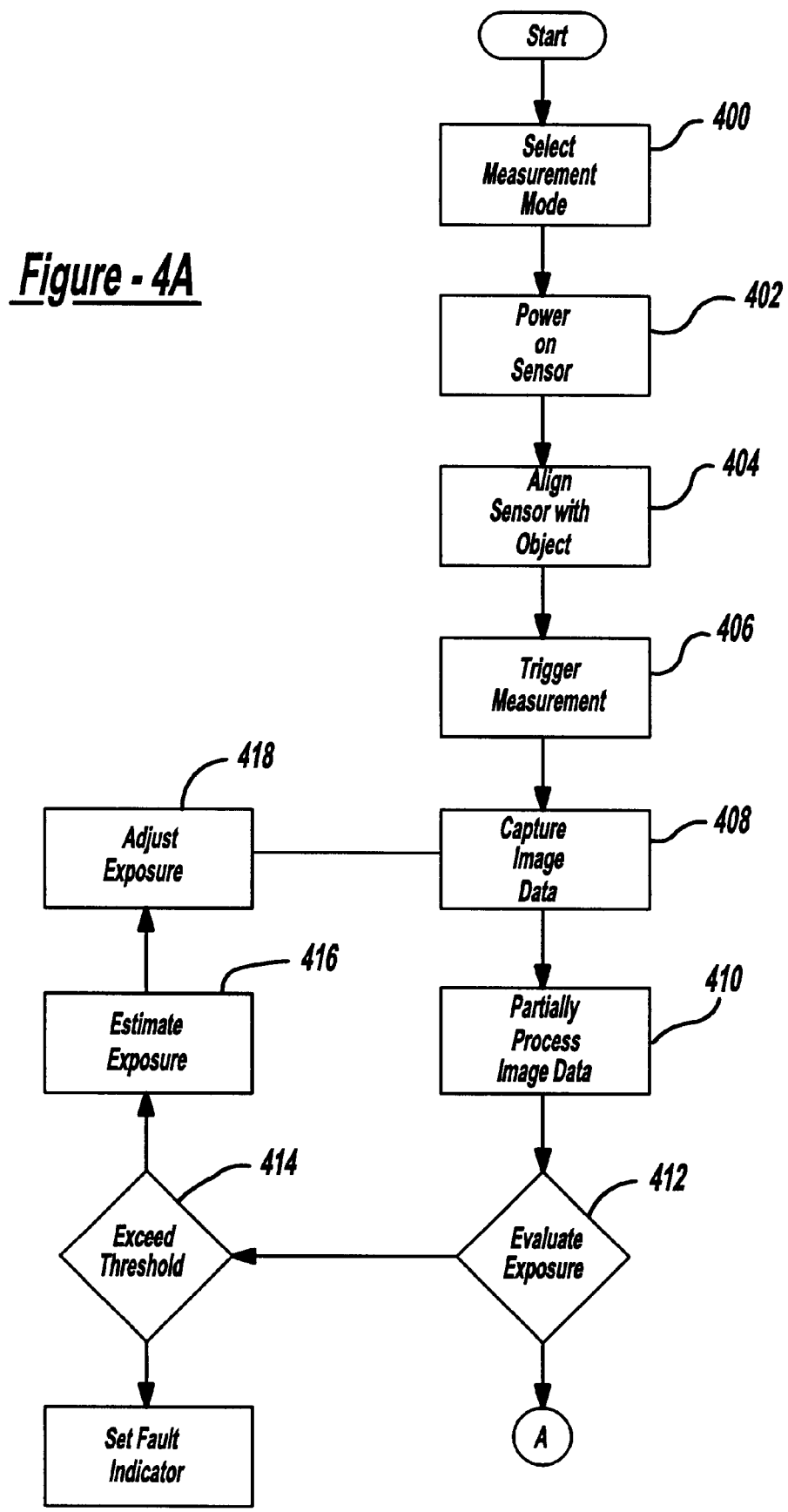
FIGS. 4A and 4B are flow charts depicting an exemplary measurement cycle for the non-contact measurement device in accordance with the present invention.
Figure 4B:
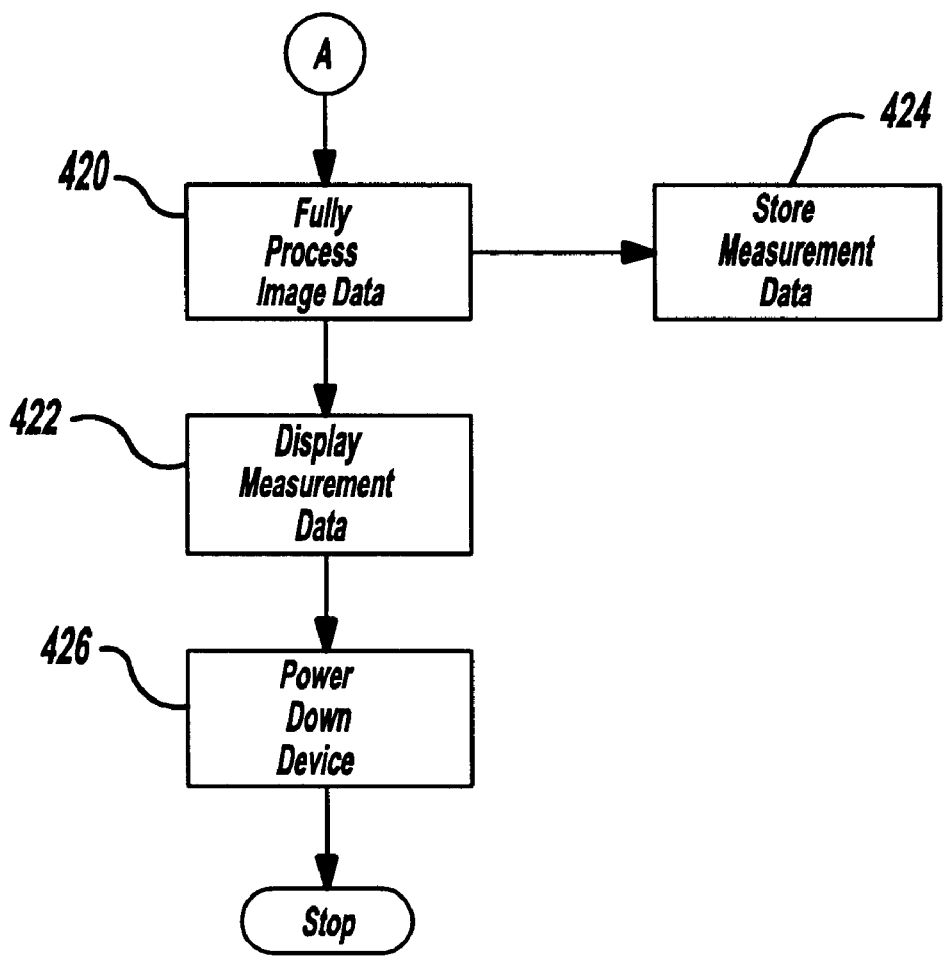

A typical measurement cycle for the above-described measurement device 10 is depicted in FIG. 4. Initially, device preparation steps are performed by the user. In step 400, the user selects the measurement mode for the device. The measurement mode indicates the type of measurement that is to be taken (e.g., width of an object, angle between two adjacent surfaces, etc.) by the device. As will be apparent to one skilled in the art, the measurement mode determines the algorithm used to convert the image data into measurement data as well as dictates the how the measurement data will be displayed to the user. In addition, the sensor is powered on by the user in step 402. As a result, the measure laser plane and possibly an auxiliary alignment beam are projected from the measurement device 10.

Next, the user directs the measurement device towards the object to be measured in step 404. In particular, the measurement device is positioned such that the measured object falls within the field of view of the non-contact sensor. It is envisioned that an auxiliary laser light source may be used to assist the user in localizing the measured object within the center of the field of view of the sensor.

The user can then trigger a measurement as shown in step 406. By activating the applicable user input element, a trigger command is generated and sent to the controller. In response to the trigger command, the controller sets the camera exposure to some predefined value and then commands the camera to capture image data at step 408. It is also envisioned that the user may set the camera exposure via the user input elements as part of the above-described device preparation process.

In a preferred embodiment of the present invention, the image data may be partially processed to determine correctness of the exposure setting as shown in step 410. One skilled the art will readily recognize that the exposure setting is dependent on various factors such as the angle of incidence and the material of the measured object. The adequacy of the exposure is evaluated in step 412. If the exposure setting for the camera is not correct, the controller may estimate the correct setting at step 416 and adjust the exposure setting at step 418 before commanding the camera to take another image. This process may be repeated until an accurate exposure setting cycle is obtained. It is envisioned that no more than two cycles would be needed in a typical application in order to achieve an accurate exposure setting. Moreover, it is expected that the time for this iterative process is much less than a second. In the event that no exposure setting is deemed to be adequate after some predefined number of iterations or some predefined threshold time, then a fault indicator is provided to the user.

If the exposure setting is deemed to be acceptable, then the image data is fully processed in step 420. To do so, the image data is transferred from the sensor to the image processor. The image processor in turn converts the image data to measurement data using the applicable algorithm. In step 422, the measurement data is visually displayed to the user. In addition to the measurement data, a visual indicator of the measurement mode as well as a visual representation of the measured object may also be displayed to the user. In step 424, the measurement data may also be stored for subsequent processing in a memory space residing on the device. The above-described measurement cycle (or some portion thereof) may be repeated to obtain additional measurement data.

Lastly, the measurement device may be powered down upon completion of the measurement cycle at step 426. After some predefined time period of inactivity, it is envisioned that the sensor will power down to a standby mode. In the standby mode, the display is still readable until the measurement device is completely turned off. It is to be understood that only the relevant steps of the measurement cycle are discussed above, but that other software-implemented instructions may be needed to control and manage the overall operation of the portable measurement device.

Figure 5A:
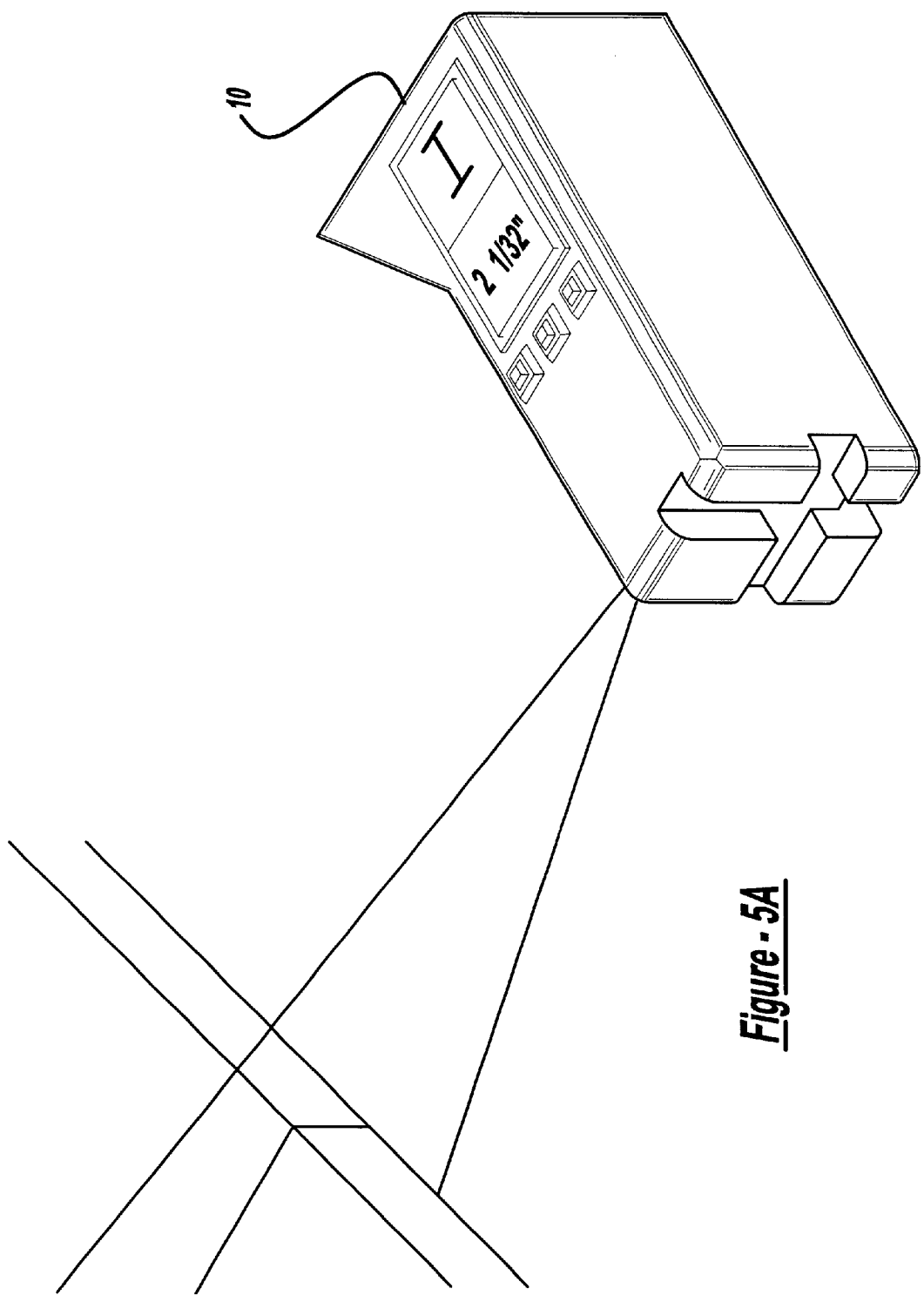
FIGS. 5A and 5B illustrate a first preferred application for the non-contact measurement device in accordance with the present invention.
Figure 5B:
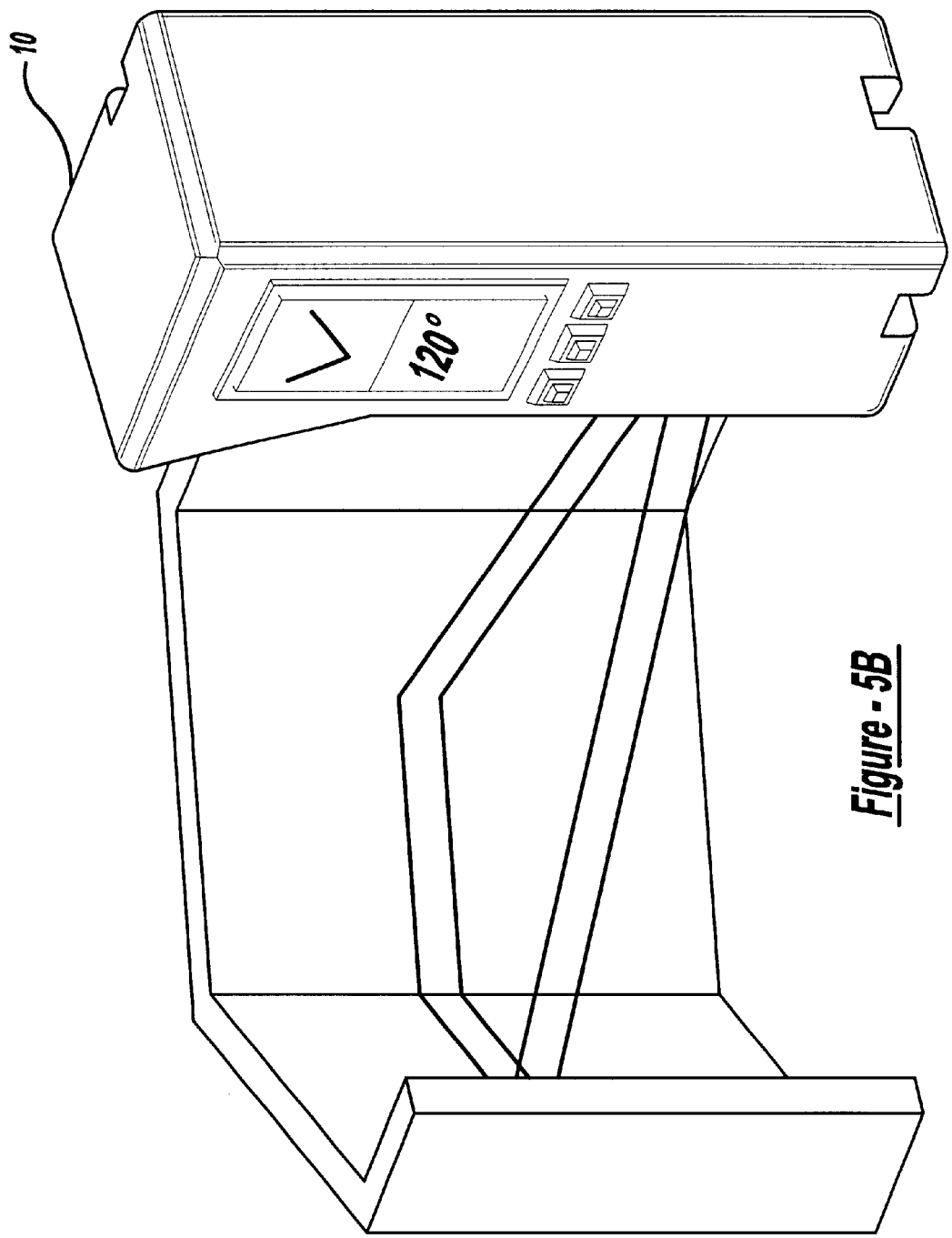

FIGS. 5A and 5B illustrate a first preferred application for the portable measurement device 10 of the present invention. Referring to FIG. 5A, the portable measurement device 10 is hand-held to measure various dimensional or angular attributes of a measured object. Measurement data for the object may include (but is not limited to) the angle between any two surfaces, compound angle for any two surfaces, the height of an object, the width of an object, and the diameter of an object. In this instance, the measurement device 10 is measuring the height of a board. In another instance, the measurement device 10 may measure the angle between two surface as shown in FIG. 5B. It is envisioned that many other types of dimensional or angular measurements (e.g., width and depth of slots or holes in an object) are also within the scope of the present invention.

A hand-held measurement device preferably uses at least two projected laser planes to improve the accuracy of measurement data. One skilled in the art will readily recognize that the second laser plane is used to eliminate error caused by a non-normal incident angle of the projected laser plane with the surface of the measured object. In this way, the measurement device need not be perpendicular to the measure object in order to obtain accurate measurement data. It should also be appreciated that the portable nature of the measurement device 10 allows it to be placed on any flat surface (e.g., on a workbench or on the floor), mounted in a stand, or positioned in other areas of a typical work environment, such that the housing assembly of the device serves as a reference plane for the measurement data.

Figure 6:
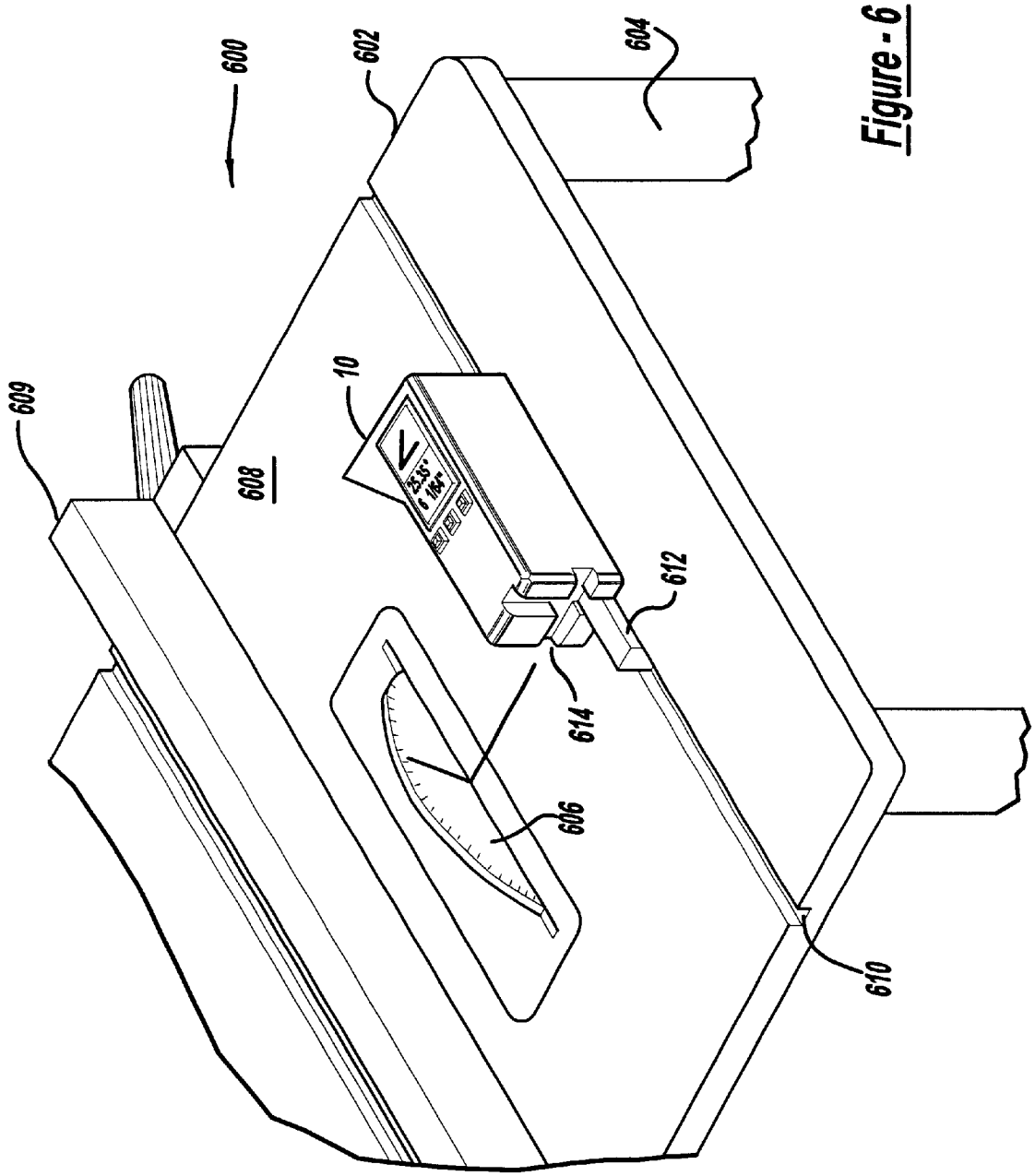
FIG. 6 illustrates a second preferred application for the non-contact measurement device in accordance with the present invention.

FIG. 6 illustrates a second preferred application for the portable measurement device 10 of the present invention. In this instance, the measurement device is integrated with a power tool assembly. While the following description is provided with reference to a table saw, it is readily understood that the broader aspects of the present invention are applicable to other types of power tool assemblies, such as radial arm saws, band saws, drill presses, router, shapers, planers, joiners, and lathes.

The power tool assembly 600 includes a work table 602 adapted to support at least one power tool in a proximate location to the work table, and a support structure 604 for supporting the work table 602 in an elevated position above a substantially planar surface, such as the surface of a workbench or the floor. For instance, a saw blade 606 extends through a working surface 608 of the table as shown in FIG. 6. The power tool assembly 600 may further include a movable guide fence 609 as is well known in the art.

The portable measurement device 10 is slidably mounted and movable along the surface of the working surface of table as shown in FIG. 6. In this preferred embodiment, a slide slot 610 is formed into the working surface of the table to facilitate the movement of the measurement device along the work table 602. A slide member 612 is disposed into one of the grooves 614 which are formed in the housing assembly of the measurement device 10. The slide member 612 of the measurement device in turn slidably engages the slide slot 610 of the working table 602. In this way, the measurement device 10 is slidably movable along the length of the work table. As will be apparent to one skilled in the art, other known techniques may be used to mounting the measurement device to the work table. Rather than a detachable accessory, the measurement device may alternatively be part of or incorporated into the structure of the power tool assembly.

The measurement device 10 may determine various measurements associated with the power tool support assembly and the operation of an accompanying power tool. It should be appreciated that while two or more projected laser planes may be used to improve the accuracy of measurement data, only a single projected laser plane is needed in this application. In the case of a table saw, types of applicable measurements may include (but is not limited to) the angle of the saw blade relative to the working surface, the height of the saw blade, the saw blade run out, the angle of the guide fence relative to the saw blade or to the working surface, the distance between the guide fence and the saw blade, and the height of a workpiece on the work table. One skilled in the art will readily recognize that the types of selectable measurement modes may be dependent on the type and configuration of the power tool assembly. Therefore, it is envisioned that other types of measurements are also within the scope of the present invention.

From the foregoing, it will be appreciated that the present invention provides a significant advance in the art of portable measurement devices. The invention quickly and accurately performs non-contact measurements of dimensions and/or angles associated with various objects in a home or commercial work area. While the invention has been described in its presently preferred form, it will be understood that the invention is capable of modification without departing from the spirit of the invention as set forth in the appended claims.

What is claimed is:

1. A hand-held measurement device for determining dimensional measurement data for a measured object, comprising:
   a portable housing assembly;
   an user input element integrated with the housing assembly for generating a trigger signal to initiate measurement of the measured object;
   a non-contact sensor mounted in the housing assembly and adapted to receive the trigger signal from an input device, the non-contact sensor is operable to collect image data representative of a surface of the measured object in accordance with laser triangulation principles;
   an image processor mounted in the housing assembly and adapted to retrieve image data from the non-contact sensor, the image processor is operable to convert the image data into dimensional measurement data for the measured object; and
   a display integrated with the housing assembly and adapted to receive dimensional measurement data from the image processor, the display is operable to visually display the dimensional measurement data, wherein the user input element and the display are cooperatively operable to facilitate selection of a measurement mode by a user, where the measurement mode is indicative of a type of measurement to be taken by the measurement device.

2. The hand-held measurement device of claim 1 wherein the non-contact sensor simultaneously emits at least two planes of structured light onto the measured object.

3. The hand-held measurement device of claim 1 wherein the non-contact sensor emits structured light in a predefined planar configuration onto the measured object and receives image data correlating to an intersection between the structured light and the surface of the measured object.

4. The hand-held measurement device of claim 1 wherein the measurement mode is be selected from the group consisting of the angle between any two surfaces, compound angles for any two surfaces, the height of an object, the width of an object, and the diameter of an object.

5. The hand-held measurement device of claim 1 wherein the display is further operable to display at least one of a visual indicator of the measurement mode and a visual representation of the measured object.

6. A method for determining dimensional measurement data for a measured object, comprising the steps of:
   providing a hand-held measurement device;
   selecting a measurement mode for the measurement device, where the measurement mode is indicative of a type of measurement to be taken by the measurement device;

triggering a measurement of the measured object by activating a user input element associated with the measurement device measured object;

converting the image data into dimensional measurement data for the measured object using an image processor associated with the measurement device; and visually displaying dimensional measurement data for the measured object on a display device associated with the measurement device.

7. The method of claim 6 further comprising the step of directing the measurement device towards the measured object, such that the non-contact sensor having a field of view and the measured object falls within the field of view of the non-contact sensor, prior to the step of triggering a measurement.

8. The method of claim 6 wherein the measurement mode is selected from the group consisting of the angle between any two surfaces, compound angles for any two surfaces, the height of an object, the width of an object, and the diameter of an object.

9. The method of claim 6 wherein the step of collecting image data further comprises the step of simultaneously emitting at least two planes of structured light onto the measured object and receiving image data indicative of the intersection.

10. The method of claim 6 wherein the step of visually displaying dimensional measurement data further comprises displaying at least one of a visual indicator of the measurement mode and a visual representation of the measured object.

11. The hand-held measurement device of claim 6 wherein the image processor is further operable to correct measurement error caused by a non-normal incident angle between the planes of structured light and an incident surface of the measured object, such that the correction is based on the at least two planes of structured light simultaneously emitted by the non-contact sensor.

* * * * *